US007962381B2

(12) United States Patent
Handel et al.

(10) Patent No.: US 7,962,381 B2
(45) Date of Patent: Jun. 14, 2011

(54) SERVICE DESIGNER SOLUTION

(75) Inventors: Sean Handel, Moss Beach, CA (US);
Sriram Chakravarthy, San Jose, CA (US); Santam Alag, Santa Clara, CA (US); Mark Orttung, Menlo Park, CA (US); Matt Mihic, San Francisco, CA (US); Brenton D. Pennock, San Jose, CA (US)

(73) Assignee: Rearden Commerce, Inc., Foster City, CA (US)

( * ) Notice: Subject to any disclaimer, the term of this patent is extended or adjusted under 35 U.S.C. 154(b) by 948 days.

(21) Appl. No.: 11/292,503

(22) Filed: Dec. 1, 2005

(65) Prior Publication Data

US 2006/0085512 A1 Apr. 20, 2006

Related U.S. Application Data

(63) Continuation-in-part of application No. 10/966,556, filed on Oct. 15, 2004, now Pat. No. 7,660,743.

(51) Int. Cl.
G06F 17/60 (2006.01)
(52) U.S. Cl. ............... 705/28; 705/14; 705/1; 709/208; 709/212; 709/224; 715/810; 717/100
(58) Field of Classification Search .............. 705/28, 705/14, 1; 709/208, 212, 224
See application file for complete search history.

(56) References Cited

U.S. PATENT DOCUMENTS

| 5,513,126 | A | 4/1996 | Harkins et al. |
|---|---|---|---|
| 5,892,909 | A | 4/1999 | Grasso et al. |
| 5,966,658 | A | 10/1999 | Kennedy et al. |
| 6,009,408 | A | 12/1999 | Buchanan |
| 6,091,956 | A | 7/2000 | Hollenberg |
| 6,157,945 | A | 12/2000 | Balma et al. |
| 6,249,252 | B1 | 6/2001 | Dupray |
| 6,253,369 | B1 | 6/2001 | Cloud et al. |
| 6,292,830 | B1 | 9/2001 | Taylor et al. |
| 6,304,850 | B1 | 10/2001 | Keller et al. |
| 6,317,686 | B1 | 11/2001 | Ran |
| 6,336,072 | B1 | 1/2002 | Takayama et al. |
| 6,338,081 | B1 | 1/2002 | Furusawa et al. |
| 6,397,191 | B1 | 5/2002 | Notaini et al. |
| 6,591,263 | B1 | 7/2003 | Becker et al. |
| 6,741,969 | B1 | 5/2004 | Chen et al. |
| 6,804,658 | B2 | 10/2004 | Lim et al. |
| 6,837,427 | B2 | 1/2005 | Overhultz et al. |
| 6,980,993 | B2 | 12/2005 | Horvitz et al. |
| 7,013,149 | B2 | 3/2006 | Vetro et al. |
| 7,035,811 | B2 | 4/2006 | Gorenstein |

(Continued)

OTHER PUBLICATIONS

Trip.com Takes Off as Cendant-Affiliant Re-Launches Full-Service Leisure Travel Web Sit With $40-Plus Million Ad Campaign, PR Newswire, Apr. 29, 2002 (3 pages).

(Continued)

Primary Examiner — Vanel Frenel
(74) Attorney, Agent, or Firm — Greenberg Traurig, LLP

(57) ABSTRACT

In one embodiment, a system and method are provided that allows easy integration of an existing third-party information or services management system into a services platform such as a Platform without requiring actual compiled code to be written. In addition, in one embodiment, the system and method allow developers to create new applications without requiring actual code to be written, which applications run on a services platform such as a Platform and are easily billable, upgradeable and supportable.

18 Claims, 6 Drawing Sheets

U.S. PATENT DOCUMENTS

| | | | |
|---|---|---|---|
| 7,072,886 B2 | 7/2006 | Salmenkaita et al. | |
| 7,124,024 B1 | 10/2006 | Adelaide et al. | |
| 7,127,677 B2* | 10/2006 | Chou | 715/741 |
| 7,139,978 B2 | 11/2006 | Rojewski | |
| 7,154,621 B2* | 12/2006 | Rodriguez et al. | 358/1.15 |
| 7,194,417 B1 | 3/2007 | Jones | |
| 7,280,823 B2 | 10/2007 | Ternullo et al. | |
| 7,283,970 B2 | 10/2007 | Cragun et al. | |
| 7,284,002 B2 | 10/2007 | Doss et al. | |
| 7,289,812 B1 | 10/2007 | Roberts et al. | |
| 7,296,017 B2 | 11/2007 | Larcheveque et al. | |
| 7,330,112 B1 | 2/2008 | Emigh et al. | |
| 7,376,735 B2 | 5/2008 | Straut et al. | |
| 7,394,900 B1 | 7/2008 | Gerber et al. | |
| 7,401,025 B1 | 7/2008 | Lokitz | |
| 7,409,643 B2 | 8/2008 | Daughtery | |
| 7,426,537 B2 | 9/2008 | Lee et al. | |
| 7,430,724 B2 | 9/2008 | Othmer | |
| 7,441,203 B2 | 10/2008 | Othmer et al. | |
| 7,739,134 B2 | 6/2010 | Mortimore, Jr. et al. | |
| 2001/0029425 A1 | 10/2001 | Myr | |
| 2002/0010604 A1 | 1/2002 | Block | |
| 2002/0019786 A1 | 2/2002 | Gonzalez et al. | |
| 2002/0026356 A1 | 2/2002 | Bergh et al. | |
| 2002/0032591 A1 | 3/2002 | Mahaffy et al. | |
| 2002/0040352 A1 | 4/2002 | McCormick et al. | |
| 2002/0049644 A1 | 4/2002 | Kargman | |
| 2002/0072937 A1 | 6/2002 | Domenick et al. | |
| 2002/0072938 A1 | 6/2002 | Black et al. | |
| 2002/0087366 A1 | 7/2002 | Collier et al. | |
| 2002/0099613 A1 | 7/2002 | Swart et al. | |
| 2002/0116266 A1 | 8/2002 | Marshall | |
| 2002/0143655 A1 | 10/2002 | Elston et al. | |
| 2002/0156659 A1 | 10/2002 | Walker et al. | |
| 2002/0178034 A1 | 11/2002 | Gardner et al. | |
| 2003/0023499 A1 | 1/2003 | Das et al. | |
| 2003/0028390 A1 | 2/2003 | Stern et al. | |
| 2003/0033164 A1 | 2/2003 | Faltings | |
| 2003/0050964 A1 | 3/2003 | Debaty et al. | |
| 2003/0053611 A1 | 3/2003 | Lee | |
| 2003/0120530 A1 | 6/2003 | Casati et al. | |
| 2003/0126095 A1 | 7/2003 | Allen | |
| 2003/0187705 A1 | 10/2003 | Schiff et al. | |
| 2003/0187710 A1 | 10/2003 | Baumer et al. | |
| 2003/0200146 A1 | 10/2003 | Levin et al. | |
| 2003/0208754 A1 | 11/2003 | Sridhar et al. | |
| 2003/0220835 A1 | 11/2003 | Barnes, Jr. | |
| 2003/0229900 A1 | 12/2003 | Reisman | |
| 2003/0233278 A1 | 12/2003 | Marshall | |
| 2004/0088107 A1 | 5/2004 | Seligmann | |
| 2004/0106399 A1 | 6/2004 | Ki | |
| 2004/0128196 A1 | 7/2004 | Shibuno | |
| 2004/0193432 A1 | 9/2004 | Khalidi | |
| 2004/0215517 A1 | 10/2004 | Chen et al. | |
| 2004/0225540 A1 | 11/2004 | Waytena et al. | |
| 2005/0010472 A1 | 1/2005 | Quatse et al. | |
| 2005/0027570 A1* | 2/2005 | Maier et al. | 705/3 |
| 2005/0033613 A1 | 2/2005 | Patullo et al. | |
| 2005/0043974 A1 | 2/2005 | Vassilev et al. | |
| 2005/0071245 A1 | 3/2005 | Norins et al. | |
| 2005/0138187 A1 | 6/2005 | Breiter et al. | |
| 2005/0143064 A1 | 6/2005 | Pines et al. | |
| 2005/0209772 A1 | 9/2005 | Yoshikawa et al. | |
| 2005/0227712 A1 | 10/2005 | Estevez et al. | |
| 2005/0254440 A1* | 11/2005 | Sorrell | 370/264 |
| 2005/0273373 A1 | 12/2005 | Walker et al. | |
| 2006/0004511 A1 | 1/2006 | Yoshikawa et al. | |
| 2006/0004623 A1 | 1/2006 | Jasti | |
| 2006/0020565 A1 | 1/2006 | Rzevski et al. | |
| 2006/0041477 A1 | 2/2006 | Zheng | |
| 2006/0080257 A1* | 4/2006 | Vaughan et al. | 705/51 |
| 2006/0149655 A1 | 7/2006 | Leahy et al. | |
| 2006/0206412 A1 | 9/2006 | Van Luchene et al. | |
| 2006/0235754 A1 | 10/2006 | Walker et al. | |
| 2006/0247954 A1 | 11/2006 | Hunt | |
| 2007/0016514 A1 | 1/2007 | Al-Abdulqader et al. | |
| 2007/0143153 A1 | 6/2007 | Ashby et al. | |
| 2007/0162301 A1 | 7/2007 | Sussman et al. | |
| 2007/0162328 A1 | 7/2007 | Reich | |
| 2008/0155470 A1* | 6/2008 | Khedouri et al. | 715/810 |
| 2009/0030609 A1 | 1/2009 | Orttung | |
| 2009/0030742 A1 | 1/2009 | Orttung | |
| 2009/0030769 A1 | 1/2009 | Orttung | |
| 2009/0101710 A1 | 4/2009 | Chakravarthy | |

OTHER PUBLICATIONS

Orbitz, LLC, search results of online search for flights at www.orbitz.com, Mar. 11, 2009.

Reed, Dan et al., "More people find ways to squeeze fun into work trips; For many business travelers, taking family or friends on a trip at relatively low cost has become a handy job perk," USA Today, McLean VA, May 20, 2003, p. E12.

Restaurant row selects serveclick from connectria to power its advanced online restaurant "e-scheduling". Business Wire, New York, Feb. 1, 2000.

Sharkey, Joe, "Leisure activities are increasingly being fitted in to help make life on the road less of a grind," The New York Times, New York, N.Y., Apr. 18, 2001, p. C6.

Smith, Calvin et al., "The Talaris Services Business Language: A Case Study on Developing XML Vocabulaires Using the Universal Business Language," School of Information Management & Systems, University of California, Sep. 2002, pp. 1-16.

Windley, Philip J., "Web Services Get VAN Boost" InfoWorld, vol. 26, No. 2, pp. 34-35, Jan. 12, 2004.

* cited by examiner

SERVICE DESIGNER SOLUTION

RELATED APPLICATIONS

The present application is a continuation-in-part of U.S. application Ser. No. 10/966,556, entitled "System for Optimization of Cost Management," filed Oct. 15, 2004 now U.S. Pat. No. 7,660,743 which is incorporated herein by reference.

BACKGROUND OF THE INVENTION

Some systems currently available publicly have limited functionality similar to some functionality offered in the Rearden Commerce System; however, in general the shortcoming of such currently available systems is that integration into existing suppliers' databases or applications requires extensive programming.

SUMMARY

In one embodiment, a system and method are provided that allows easy integration of an existing third-party information or services management system into a services platform such as a Platform without requiring actual compiled code to be written. In addition, in one embodiment, the system and method allow developers to create new applications without requiring actual code to be written, which applications run on a services platform such as a Platform and are easily billable, upgradeable and supportable.

BRIEF DESCRIPTION OF FIGURES

FIG. 27-1b shows an overview of the general architecture 27-100 of the service designer solution according to one embodiment.

FIG. 27-2 shows the architecture around workflow control engine 27-201 that is used to integrate the work flow as the UI pages and the work flow are configured.

FIG. 27-3 shows an overview 27-300 in accordance with one embodiment of the Service Designer solution 27-301.

FIG. 27-4 shows a more detailed example of implementation of the Service Designer solution 27-301 according to one embodiment.

FIG. 27-5 shows an example flow diagram for a typical editing and/or creation process 27-500 for creating an integration path (i.e., "connector") to allow integration with a third-party system such as, for example, a supplier system.

FIG. 27-6 shows additional generic service modules 27-600.

DETAILED DESCRIPTION OF THE INVENTION

Figures 1A, 27:
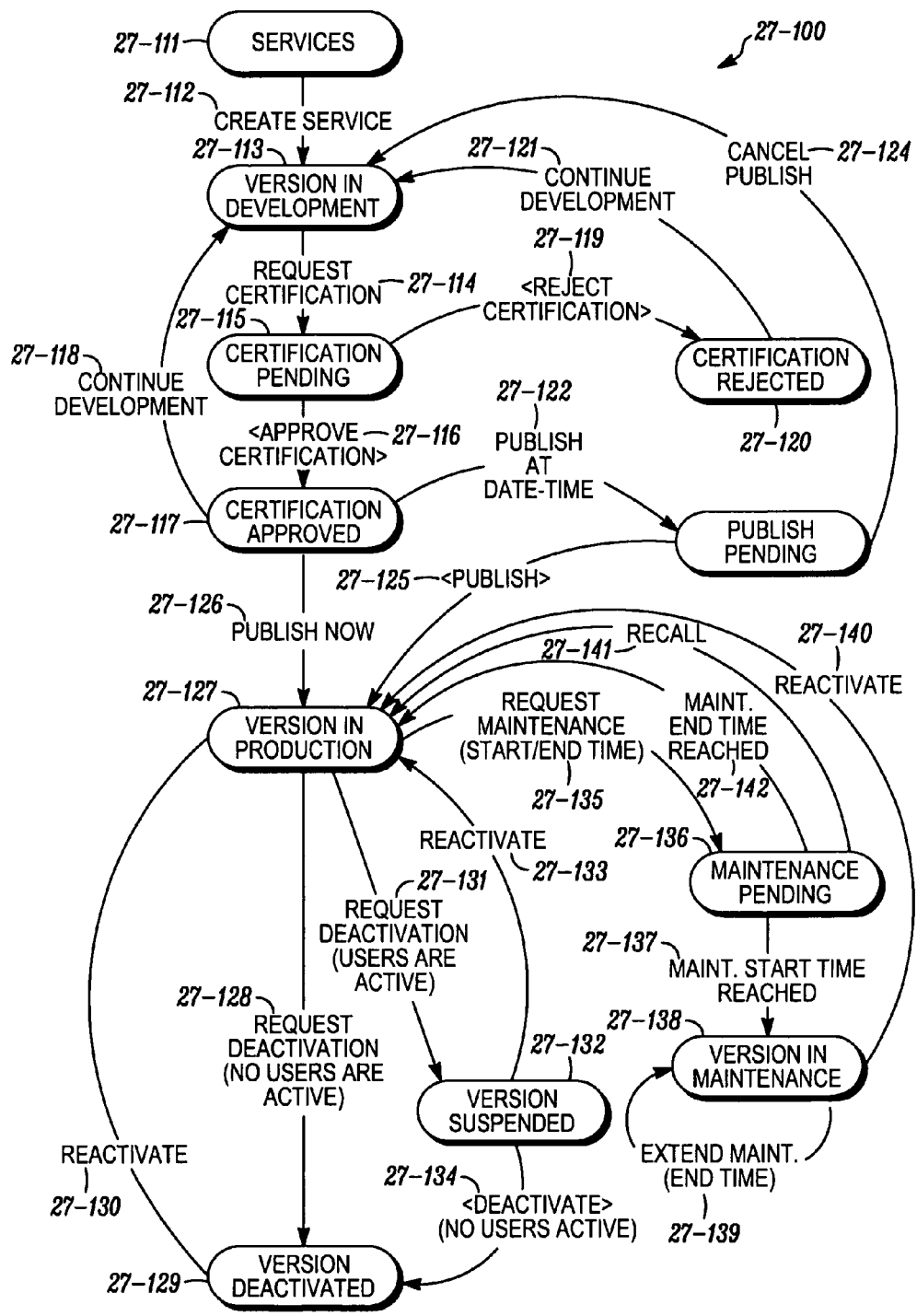
FIG. 27-1a shows an overview of an application life cycle 27-100 according to one embodiment art of this.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The On-Demand Application Platform and Marketplace is a hosted environment whereby application developers can build, test and publish On-Demand Applications to any user in the Marketplace.

The Platform is the runtime environment for the applications. The Marketplace is the web site where the applications are advertised and where users can purchase, lease or rent access to the applications.

The Platform provides a mechanism for the developer to develop a new application that is available in the Marketplace, and to provision that application to one or more users or groups of users. The Marketplace allows the developer to meter usage of the applications, to bill users and groups of users (such as a corporate entity) for use of the application, and to manage privileges and access to the application. The developer can provide granular access rights to each application so that only certain users are allowed to use it or even see that it is available in the Marketplace.

The developer is able to provide a standard Service Level Agreement (SLA) for this application based on the overall SLA provided by the Platform with any external dependencies factored in. For example, if the overall SLA for service uptime on the Platform is 99.9995%, but the developer has an external service with 99.5% uptime that is embedded as a runtime component in the on-demand application built on the Platform, he can offer some variation of uptime SLA to his customers, potentially 99.5% in this case. The Platform would monitor the actual uptime and report back to the users in the Marketplace and to the developer on actual vs. committed performance along a variety of metrics, uptime being one example.

The Platform also offers developers the ability to use other applications that are available in the Marketplace for sub-components of their applications. For example, Developer A could have built a mapping application that allows the user to view and print maps and directions via a web-based user interface. As part of that mapping application, he has also built a web services interface that allows programmatic access to these same functions. Developer B can then build the mapping service from Developer A into his application that also runs on the Platform. Developer B can license access to the mapping service from Developer A and either pass through the charge for the mapping application to the end user or pay the charge himself and mark up the cost his own application accordingly.

The Marketplace also offers a rating engine for users to view when deciding whether to buy access to an on-demand application.

Because customers are able to configure the applications rather than modify the applications at will, the application author has support tools that reflect the configuration options set by each customer and access to transactional information provided by the customer through the platform provider, allowing the support process to be quick and painless.

The Marketplace also offers the opportunity for a developer to advertise or market his application to users on the system based on their profile characteristics, past usage of other applications, and opt-in preferences. Also, the directory of available services that is shown to a user is potentially limited to those applications that are applicable to him based on his profile. For example, a user who lives in the United Kingdom may not be shown applications that only work in the United States for various reasons.

The Platform and Marketplace are inherently secure. The developers of applications have no knowledge of users who are using their applications other than what is provided as part of the licensing process or through runtime transactions that transmit information outside of the Platform for business reasons. The users of these applications can, at any time, request an auto-generated "privacy report" that shows what of their information would be made available to the developer through this application at runtime. In the embodiment, the user can request a report even before he uses or buys the application to find out what information the developer would be accessing as part of the application.

The service designer solution according to one embodiment allows creation of new applications by the developer without any programming in the traditional sense (i.e., creating and compiling Java, C, C++, C#, etc, code). Instead, the developer builds a service by defining the application's runtime characteristics as meta-data. This meta-data is then interpreted by Platform components to execute the service at runtime.

In one embodiment, the developer is able to build an application with a visual tool or simply write a text (XML, for example) document with the appropriate meta-data that represents the application's runtime characteristics. The visual tool has a toolkit that allows creation of complex applications that have variable workflow, multi-page user interface flows, complex user interfaces with variable field layout, the ability to make external calls to outside services through interfaces such as a Web Service or other protocol such as FTP, HTTP, etc. Also, in one embodiment, the developer can take advantage of the core services of the service platform, such as the user-centric features of user profile access, calendar integration, address book access and updates. For example, the developer can create an application and at runtime have access to the user's profile information (e.g., home address or phone number) without having built that information directly into his application itself. The platform stores all of this user information in a central place and allows structured access to it for the developer at development time and runtime, in one embodiment.

Each of the applications built by the developer can have automatic capability to be upgraded to a new version without the end user's intervention. The developer can use a tool to map the data fields from an old version of the application to a new version of the application and have that upgrade script run for all users who are upgraded from one version to the next, providing backward compatibility and no data loss or application failures.

In one embodiment, each of the applications built on the platform inherits other capabilities such as built-in monitoring. For example, if the application makes a web service call to an external provider, the application automatically monitors the uptime characteristics of that external provider.

The developer has the ability to build in configuration options for each user or entity who licenses access to his application. For example, customer X of the application may use the configuration option to set his default time zone to Pacific Time. Customer Y of the application may use that same configuration option to set his default time zone to Eastern Time. This capability allows the developer to create multiple customization options for many types of users without having to build a new version of this application for each distinct user. It also allows him to offer one application in the Marketplace that users cannot modify in a way that breaks the upgradeability of his application.

As part of the service designer solution, the developer has application life cycle tools available to him that allow him to take his applications through the standard process of development, testing, certification, publishing, maintenance and retirement. These tools allow for graceful upgrades to new versions without user interruption and allow for retirement of applications by gradually weaning the users off of the application through a quiescing process.

FIG. 27-1a shows an overview of an application life cycle 27-110 according to one embodiment. Cycle stage 27-111 is the statement of desired services, and at cycle flow 27-112, the desired services are created. Cycle stage 27-113 is the version in development, which by default is version 1.0, in one embodiment. At cycle flow 27-114, the developer requests certification of the application. When the certification is pending in cycle stage 27-115, the life cycle flow may branch. If certification is approved, at cycle flow 27-116, the life cycle moves to cycle stage 27-117, in which certification is approved. However, if the life cycle flow branches from cycle stage 27-115 to cycle flow 27-119, where a certification server (not shown) rejects certification, then the application reaches cycle stage 27-120, at which certification is rejected, and development continues via cycle flow 27-121 back to cycle stage 27-113. Processes shown in FIG. 27-1a with asterisks indicate that the transition through this processes does not require manual intervention.

At stage 27-117, with certification approved, the flow may diverge in one or more of three directions. The cycle may go to the continue development flow 27-118, going back to the version in development at stage 27-113. At the same time, the developer may choose to the publish at a particular date and time flow 27-122 to reach publishing pending stage 27-123. At stage 27-123, the developer may choose the cancel publication flow 27-124, or he may choose the publish flow 27-125 and in time arrive at the version in production stage 27-127. Or the developer may follow publish now flow 27-126, arriving again at stage 27-127.

Stage 27-127 represents the current published version of the application. Its life cycle may then move to deactivation via two different flows or to maintenance. One way to deactivation stage 27-129 is via request deactivation flow 27-128, when no users are active. When there is a request to reactivate the application, the application returns to the version in production stage 27-127 via reactivate flow 27-130. Alternatively, request deactivation flow 27-131, when users are active, arrives at version suspended stage 27-132, and then goes to deactivation stage 27-129 via deactivate flow 27-134, again when no users are active. However, if need be, the application may be reactivated from stage 27-132 via reactivate flow 27-133, back to the version in production stage 27-127.

If the application remains active and is updated via maintenance, a maintenance request flow 27-135, with a maintenance start time and/or a maintenance end time specified, moves to the maintenance pending stage 27-136. When and if the life cycle then moves along the maintenance-start-time-reached flow 27-137, it reaches a version in maintenance stage 27-138. There the version may cycle through an extended maintenance flow 27-139. Eventually, the version in maintenance moves along the reactivate flow 27-141 back to version in production 27-127. Alternatively, the version may move from the maintenance pending stage 27-136 along a recall flow 27-143 or a maintenance end time reached flow 27-142. In either event, the version goes back to the version in production 27-127.

Figures 1B, 27:
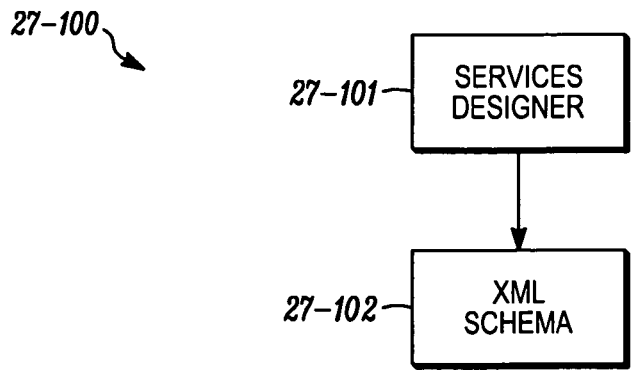

FIG. 27-1b shows an overview of the general architecture 27-100 of the service designer solution according to one embodiment. The service designer 27-101 is the section that is used by a user to configure the system for a specific purpose or task. It generates a related XML schema 27-102. Such a schema 27-102 may be used to manage and control elements of an information or services management system. Table 27-1 lists typical system elements.

TABLE 27-1

UI flow
Event definitions
Connectivity configuration
Details and orchestration flow
Business rules
Data processing mechanism
Integration of modules into existing profile, services and operations, and console configurations
Data audit
Metering and billing The discussions of FIG. 27-3 through FIG. 27-5, below, describe the XML schema 27-102 in greater detail.

Figures 2, 27:
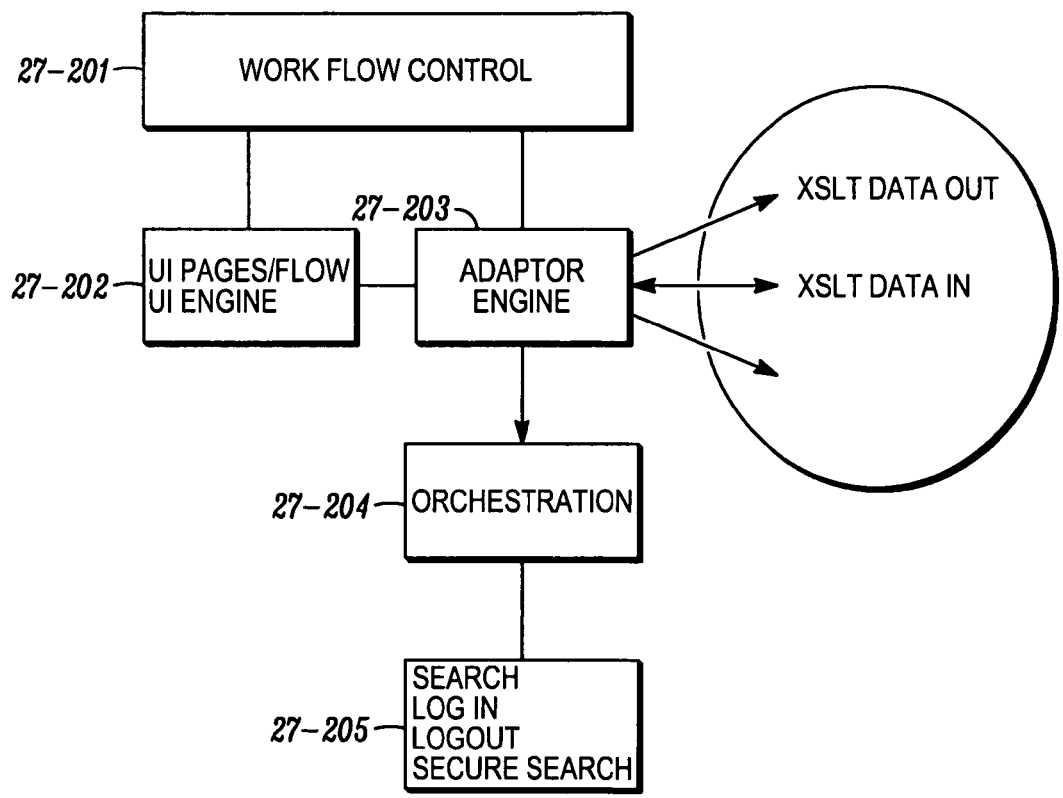

FIG. 27-2 shows the architecture around workflow control engine 27-201 that is used to integrate the work flow as the UI pages and the work flow are configured. The workflow control engine 27-201 integrates between the UI pages and flow control, which is the UI engine 27-202 and the adaptor engine 27-203. The adaptor engine 27-203 is used to communicate with a remote system over a variety of protocols and message formats. The workflow engine communicates with the adaptor engine by sending it canonical requests for service from a provider. The adaptor engine transforms these requests from the canonical format into the physical messages expected by that provider then sends the physical messages to the remote system over the communication channel defined for the provider. The adaptor engine is also responsible for the inverse process, transforming physical messages returned by the provider adaptor engine into canonical messages processed in general fashion by the workflow engine. The adaptor engine can also execute orchestrations to service requests that require complex interactions with a provider, as shown in 27-204. For example, an orchestration can service a "query request" by executing an orchestration that logs in to a provider, runs a search request, and logs out. The behavior of the adaptor engine is discussed in greater detail in the descriptions of FIG. 27-3 through FIG. 27-5, below.

In some cases, XSLT (extensible Stylesheet Language Transformation) or other, similar XML based descriptors may be used as output.

Figures 3, 27:
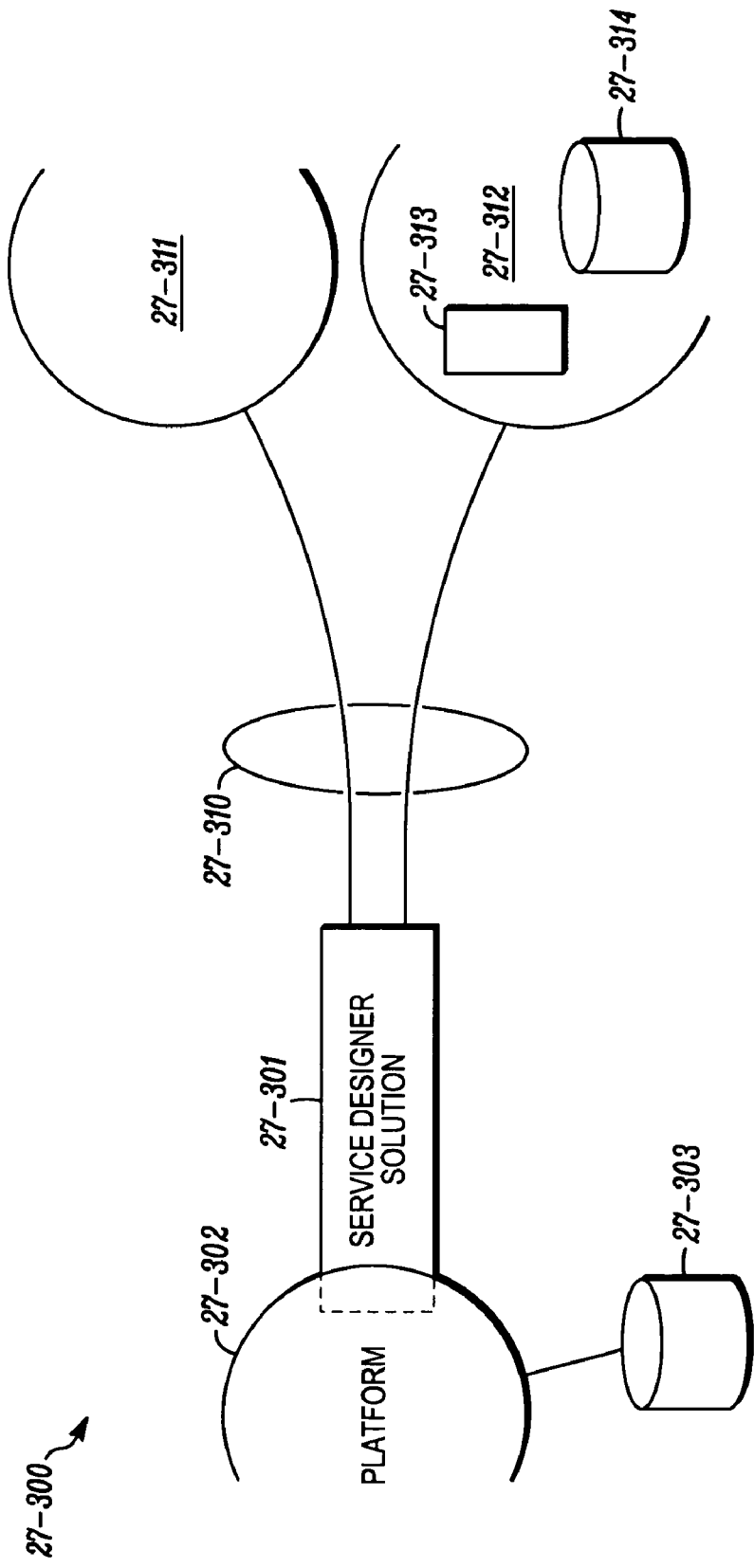

FIG. 27-3 shows an overview 27-300 in accordance with one embodiment of the Service Designer solution 27-301. Service Designer solution 27-301 is integrated into the Platform 27-302, which has a general storage means 27-303. Also shown are exemplary supplier or vendor systems 27-311 and 27-312. Shown at the clouds are communication paths 27-310, which paths typically run over the Internet, but in some cases, they may be private lines, satellite links, VPNs, fiber optics, or other suitable means. Also shown is the transaction system 27-313 of vendor 27-312, with local storage means 27-314.

Figures 4, 27:
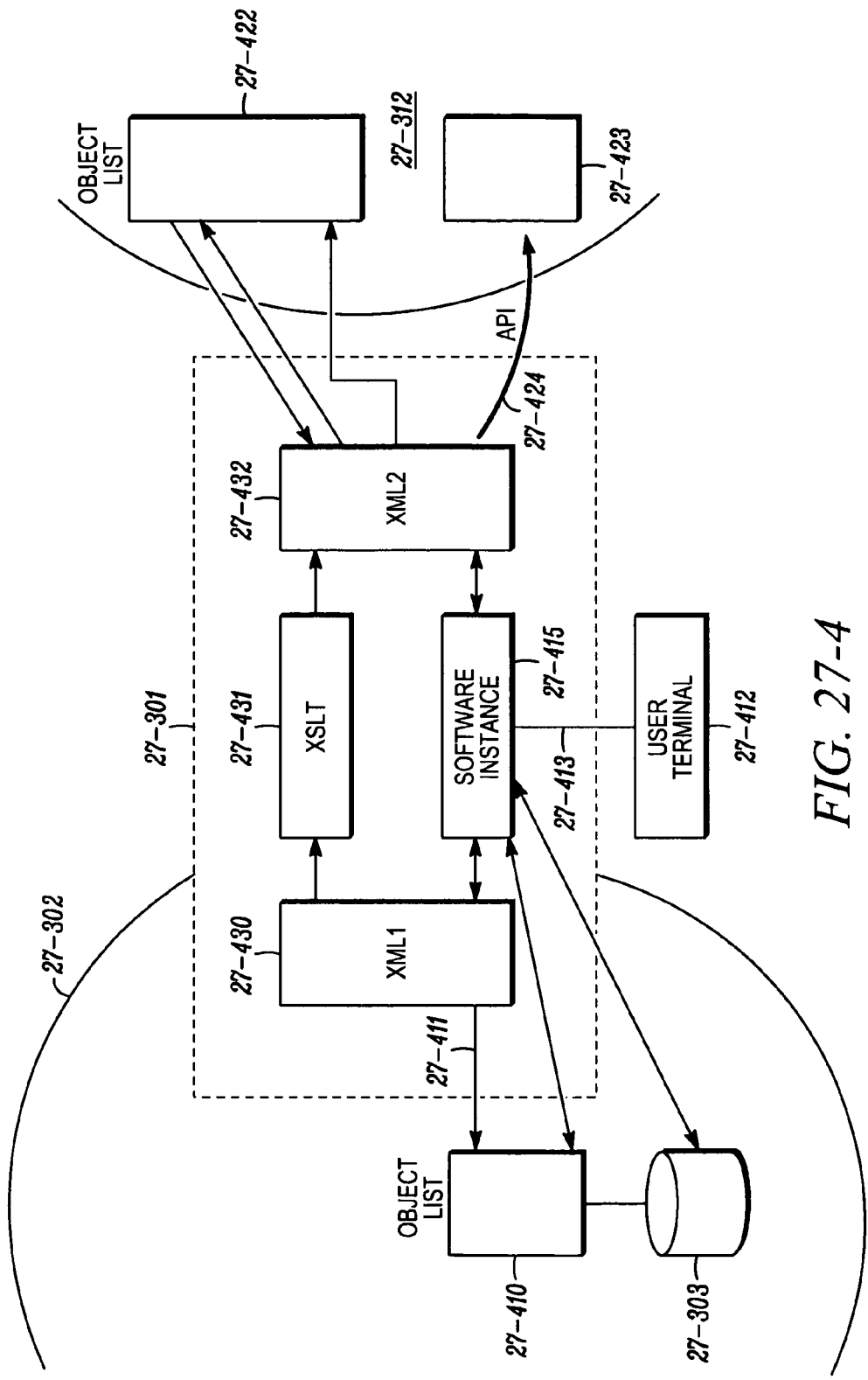

FIG. 27-4 shows a more detailed example of implementation of the Service Designer solution 27-301 according to one embodiment. This figure shows XML descriptor 27-430 integrated with the Platform 27-302. Existing or new objects of the platform on an object list 27-410 may be exported and imported over communication link 27-411 between the Designer solution 27-301 and their place of storage, which is typically storage means 27-303. The main software instance 27-415, which controls all the activities of the Designer solution 27-301, has a direct connection to object list 27-410, as well as the ability to store and retrieve data directly from the main database within storage means 27-303. This arrangement may be used, for example, to store all the local data of the Designer solution 27-301 in the main database of the platform. In other cases, however, data storage may be done locally, or third-party user data may be stored on the third-party user site, or in some other suitable data storage means. Also shown is a user terminal 27-412, connected to the unit housing main software instance 27-415 via connection 27-413. This connection does not have to be a separate physical connection. In most cases, the third-party user would use a regular PC, for example, and log in via a Web browser and the Internet with a secure connection into the main software instance 27-415. Also shown is the Extensible Stylesheet Language Transformation (XSLT) interface that can transform the XML code (and/or descriptor) 27-430 from the Rearden side to user-system specific XML2 27-432 code (and/or descriptor). This side can interface with objects 27-412 in the third-party user system and also run applications 27-423 on the third-party user side via an API that is exported using the XML2 side (27-432). This portion of the novel art of this disclosure allows, ultimately, objects from object list 27-410 to seamlessly integrate with a third-party user's existing application.

Figures 5, 27:
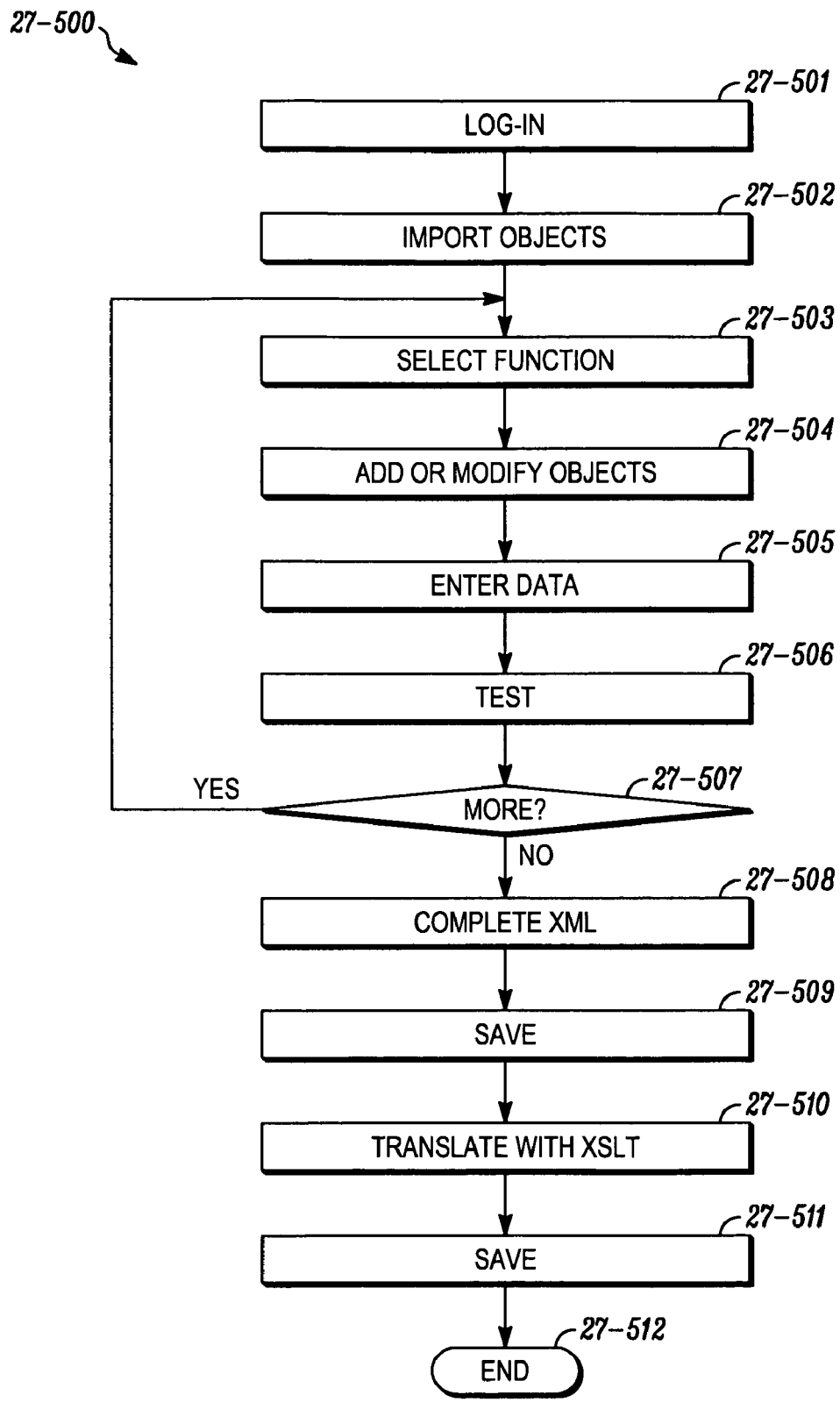

FIG. 27-5 shows an example flow diagram for a typical editing and/or creation process 27-500 for creating an integration path (i.e., "connector") to allow integration with a third-party system such as, for example, a supplier system. In step 27-501, the user would typically log in, establishing, for example, an HTTPS connection. Other proprietary or publicly available suitable terminal-type or interaction-type connections may be used, such as, for example, teletype, terminal emulation, remote access, or other similar methods. In step 27-502 the objects are imported, and in step 27-503 the functions that need to be expanded, modified, or added are selected. In step 27-504 the addition, modification, or deletion occurs, and in step 27-505 all relevant parameters, data, logos, and other material are inserted, such as, for example, the logo of a provider, a map, or any other necessary object elements that are not in the standard Platform database. In step 27-506 the module may be tested before, in step 27-507, the user decides if he wants to continue with more processing ("Yes") or complete the process ("No"). If the user wants to process more objects, or re-process the objects he has previously modified, the process loops back to step 27-503 and repeats, for as many processing cycles as the user desires. When the user decides there are no more objects to work on, the process moves to step 27-508, where the XML file is written, and then saved in step 27-509. The file is passed through the adaptor interface for adaptation to the third-party user's system in step 27-510, and the converted XML file is then saved in step 27-511. In step 27-512, the process terminates.

Figures 6, 27:
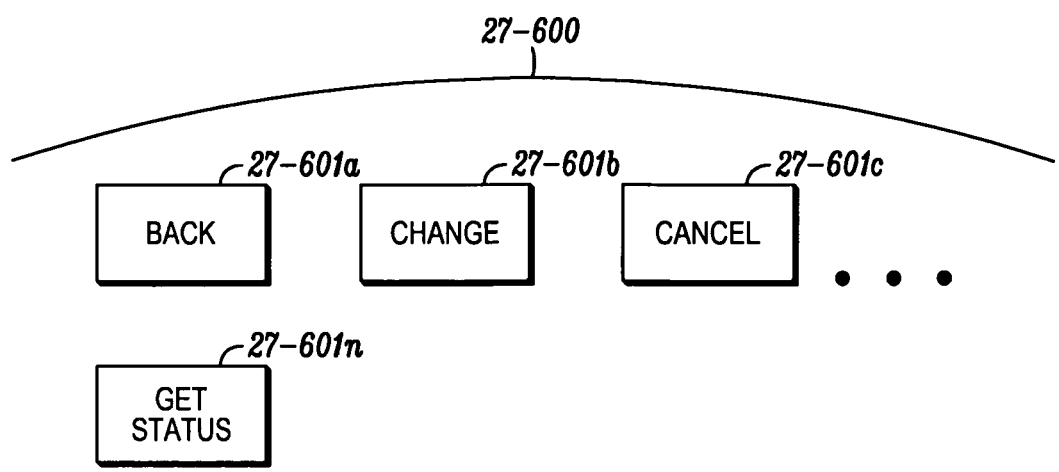

FIG. 27-6 shows additional generic service modules 27-600. Modules 27-601a through n may be plugged into the UI engine. Such modules include, for example, Back, Change, Cancel, and Get Status. Such modules are often typically implemented as standard modules in services or travel-related online provisioning systems.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Exhibit A is attached hereto and incorporated by reference.

What is claimed is:

1. A computer implemented method comprising:
   hosting a runtime environment on a computing device to provide an on-demand platform for development of on-demand software applications;
   receiving input in the on-demand platform from web browsers of a plurality of developers to separately create a plurality of on-demand software applications without requiring the developers to write actual programming code for the on-demand software applications, a respective on-demand software application under development being executed in the runtime environment hosted on the computing device and accessible by at least one user in parallel via web browsers to test the on-demand software application;
   providing, by the on-demand platform, a user with personal use of an on-demand software application selected by the user from the plurality of on-demand software applications, for testing of the on-demand software application, wherein the on-demand software applications are configurable by the user and do not require additional code to be added by the user for execution of the on-demand software applications; and
   allowing the user to combine separate on-demand software applications of the plurality of on-demand software applications on the on-demand platform to create a new on-demand software application executed in the runtime environment hosted on the computing device.

2. The method of claim 1, further comprising providing varying levels of access privileges for an on-demand software application.

3. The method of claim 1, wherein the on-demand software applications are separately generated by separate developers using the on-demand platform.

4. The method of claim 1, further comprising charging a user for use of a selected on-demand software application per a metric of use.

5. The method of claim 1, further comprising providing a user with access to submit at least one of a rating and a review of an on-demand software application.

6. The method of claim 1, further comprising providing support tools to identify configuration options of an on-demand software application to be set by a user.

7. The method of claim 1, further comprising providing access for a developer to market an on-demand software application based on user-profile.

8. The method of claim 7, wherein the user-profile comprises at least one of applications previous used by a user and a user's opt-in preferences.

9. The method of claim 1, further comprising limiting access to individual on-demand software applications on a per customer basis.

10. The method of claim 1, further comprising providing data to a user to identify data of a user of a first on-demand software application made available to the developer of the first on-demand software application.

11. The method of claim 1, wherein the input received to create the plurality of on-demand software applications includes meta-data defining run-time characteristics of the plurality of on-demand software applications.

12. The method of claim 11, wherein the meta-data of a first on-demand software application is to be interpreted to execute a service of the first on-demand software application at a run-time.

13. The method of claim 1, wherein the plurality of on-demand software applications are written by the developers via at least one of a visual tool and a text document to specify meta-data representing the run-time characteristics of the plurality of on-demand software applications.

14. The method of claim 1, wherein at least one of the on-demand software applications provides access to user-centric features external to the respective on-demand software application.

15. The method of claim 1, wherein at least one of the on-demand software applications is automatically updated with a subsequent version of the respective on-demand software application, without user intervention.

16. The method of claim 1, wherein at least one of the on-demand software applications provides at least one of variable workflow, multi-page user interface flows, user interfaces with variable field layout, and the ability to establish real-time communications with a service external to the on-demand software application.

17. A computer system comprising:
   at least one computing device having a memory and executing software instructions to:
      host a runtime environment to provide an on-demand platform for development of on-demand software applications;
      receive input in the on-demand platform from web browsers of a plurality of developers to separately create a plurality of on-demand software applications without requiring the developers to write actual programming code for the on-demand software applications, the respective on-demand software application under development being executed in the runtime environment hosted on the computing device and accessible by at least one user in parallel via web browsers to test the on-demand software application;
      provide, by the on-demand platform, a user with personal use of an on-demand software application selected by the user from the plurality of on-demand software applications, wherein the on-demand software applications are configurable by the user and do not require additional code to be added by the user for execution of the on-demand software applications; and
      allow the user to combine separate on-demand software applications of the plurality of on-demand software applications on the on-demand platform to create a new on-demand software application to be executed in the runtime environment hosted on the computing device.

18. A machine-readable medium having tangibly stored thereon a set of instructions, which when executed by a computing device cause the computing device to perform a method comprising:
   hosting a runtime environment to provide an on-demand platform for development of on-demand software applications;
   receiving input in the on-demand platform from web browsers of a plurality of developers to separately create a plurality of on-demand software applications without requiring the developers to write actual programming code for the on-demand software applications, the respective on-demand software application under development being executed in the runtime environment hosted on the computing device and accessible by at least one user in parallel via a respective web browser, to test the on-demand software application;

providing, by the on-demand platform, a user with personal use of an on-demand software application selected by the user from the plurality of on-demand software applications, wherein the on-demand software applications are configurable by the user and do not require additional code to be added by the user for execution of the on-demand software applications; and allowing the user to combine separate on-demand software applications of the plurality of on-demand software applications on the on-demand platform to create a new on-demand software application to be executed in the runtime environment hosted on the computing device.

* * * * *